United States Patent
Van Assche et al.

[11] 3,883,503
[45] May 13, 1975

[54] 4-(2-NITRO-4-SULFO- OR OPTIONALLY SUBSTITUTED SULFAMOYLANILINO)PHENYL-AZO-PHENYL DYES

[75] Inventors: Daniel Van Assche, Binningen, Basel-Land; Hanspeter Uehlinger, Basel, both of Switzerland

[73] Assignee: Sandoz Ltd., Basel, Switzerland
[22] Filed: Oct. 10, 1972
[21] Appl. No.: 296,441

[30] Foreign Application Priority Data
Oct. 13, 1971  Switzerland.................. 14978/71

[52] U.S. Cl. .................. 260/206; 8/41 B
[51] Int. Cl. .................. C09b 29/34
[58] Field of Search .................. 260/206

[56] References Cited
UNITED STATES PATENTS

| | | | |
|---|---|---|---|
| 2,879,269 | 3/1959 | Merian | 260/206 |
| 3,516,982 | 6/1970 | Dimroth et al. | 260/207.1 |
| 3,535,306 | 10/1970 | Altermatt et al. | 260/207.1 |
| 3,663,531 | 5/1972 | Liechti | 260/206 |
| 3,685,952 | 8/1972 | Renfrew | 260/206 |

FOREIGN PATENTS OR APPLICATIONS

| | | | |
|---|---|---|---|
| 158,260 | 3/1940 | Austria | 260/206 |
| 275,230 | 10/1928 | United Kingdom | 260/206 |

Primary Examiner—Henry R. Jiles
Assistant Examiner—Robert W. Ramsuer
Attorney, Agent, or Firm—Gerald D. Sharkin; Richard E. Vila; Melvyn M. Kassenoff

[57] ABSTRACT

Compounds of the formula

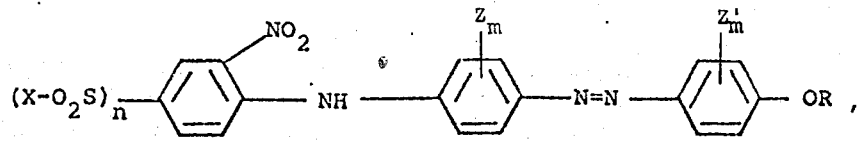

and salts thereof,
wherein
  R is alkyl or sulfoalkyl,
  X is —OH or —NHR$_1$,
wherein
  R$_1$ is hydrogen, alkyl, alkoxyalkyl, phenyl or substituted phenyl having 1 or 2 substituents wherein each substituent is independently halo, alkyl or alkoxy,
  each Z and each Z' is independently halo, alkyl or alkoxy,
  each $m$ is independently 0, 1 or 2, and $n$ is 0 or 1,
with the proviso that the molecule contains 1 or 2 sulfo groups. These compounds are useful for dyeing natural or synthetic polyamide fibres or polyurethane fibres. They exhibit good fastness to light, rubbing, wet treatments, milling, perspiration and, when used in combination with other dyes, catalytic fading.

24 Claims, No Drawings

4-(2-NITRO-4-SULFO- OR OPTIONALLY SUBSTITUTED SULFAMOYLANILINO)PHENYL-AZO-PHENYL DYES

The invention provides compounds of formula I,

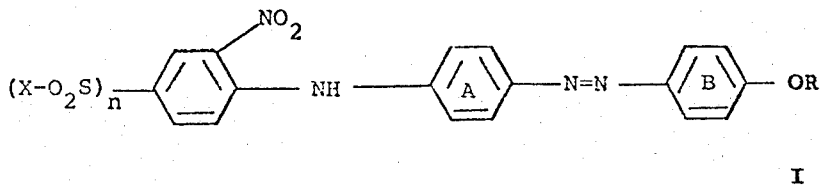

I in which
R signifies an alkyl radical of 1 to 6 carbon atoms or an alkyl radical of 1 to 6 carbon atoms substituted by a sulphonic acid group,
X signifies the group —OH or the group —NHR$_1$, in which
R$_1$ signifies a hydrogen atom, an alkyl radical of 1 to 6 carbon atoms, or an alkoxy alkyl radical, the alkoxy moiety and alkyl moiety each containing from 1 to 6 carbon atoms, an unsubstituted phenyl radical, a phenyl radical substituted by a halogen atom or substituted by an alkyl or alkoxy radical of 1 to 6 carbon atoms,
$n$ signifies 0 or 1, and
rings A and B, independently, are further unsubstituted or substituted by up to two substituents selected from halogen, alkyl of 1 to 6 carbon atoms and alkoxy of 1 to 6 carbon atoms,
with the proviso that the molecule contains 1 or 2 sulphonic acid groups,
which compounds may be in free acid or salt form. R$_1$ can also be a phenyl radical having two substituents wherein each substituent is independently halo, alkyl of 1 to 6 carbon atoms or alkoxy of 1 to 6 carbon atoms.

The invention also provides a process for the production of compounds of formula I, characterised by alkylating or sulphoalkylating a compound of formula II,

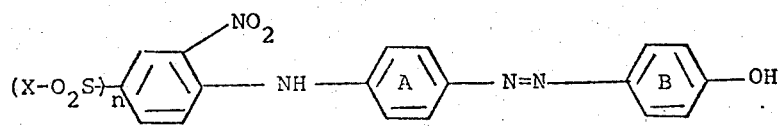

II in which X, $n$, and rings A and B are as defined above,
and, where required, converting any free acid form into salt form or vice versa.

The process may be carried out in conventional manner using, for example, as alkylating agent, a compound of formula R—Y, in which Y signifies the acid radical of an ester or, as sulphoalkylating agent, a sultone. As examples of suitable alkylating agents may be given dialkyl sulphates, e.g. dimethyl and diethyl sulphates, sulphonic acid alkylesters, especially toluenesulphonic acid methyl or ethyl ester, and dimethyl sulphoxide in the presence of silver tetrafluoroborate. A preferred method of sulphoalkylation comprises reacting the compound of formula II with aliphatic, cyclic sultones, in particular 1,2-oxathiolan-2,2-dioxide. This reaction can be carried out in aqueous or in aqueous organic or organic, alkaline medium at room temperature or at a higher temperature, for example at 100°C.

The resulting compounds of formula I may be isolated in conventional manner.

The compounds of formula II, stated above, may be obtained in conventional manner, for example by
a. coupling the diazo compound of an amine of formula III,

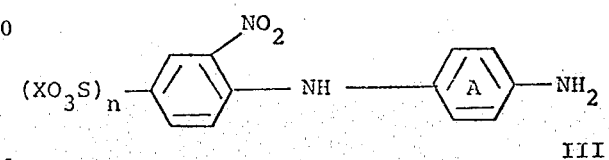

III in which X, $n$ and ring A are as defined above,
with a compound of formula IV,

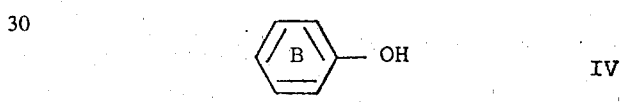

IV in which ring B is as defined above,
or
b. by condensing an aminoazo compound of formula V,

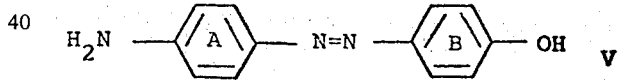

V in which rings A and B are as defined above,
with a compound of formula VI,

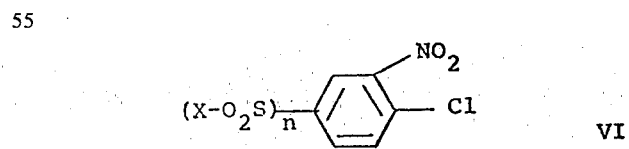

VI in which X and $n$ are as defined above.

The above processes (a) and (b) may be carried out in conventional manner.

Any alkyl or alkoxy radicals in the compounds of formula I are preferably of 1 to 4 carbon atoms, most preferably of 1, 2 or 3 carbon atoms except when R is sulfoalkyl it preferably has 2 to 4 carbon atoms. Any halogen atom in the compounds of formula I is a chlorine or bromine atom preferably a chlorine atom. X preferably signifies an OH group. The preferred salt forms of the compounds of formula I are the alkalimetal salt forms and the ammonium salt forms, the sodium salt form being most preferred.

The preferred compounds of formula I are those of formula Ia,

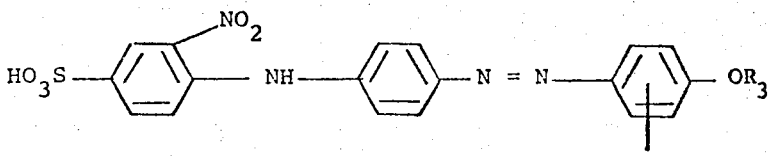

in which
 $R_2$ signifies a hydrogen atom or a methyl or methoxy group, and $R_3$ signifies a methyl or ethyl radical,
which compounds may be in free acid or salt form.

British Pat. No. 275,230 discloses monosulphonated arylazodiarylamines which contain at least one nitro group in the diarylamino radical, together with the use thereof in the dyeing of cellulose esters and ethers. Generally, these compounds give dyeings of insufficient fastness, in particular insufficient light fastness on natural and synthetic polyamide fibres. Surprisingly, however, it has been found that the compounds of formula I, provided by the present invention, give dyeings on natural and synthetic polyamide fibres and on polyurethane fibres which have notable fastness properties.

Thus, the invention also provides a process for dyeing natural or synthetic polyamide fibres or polyurethane fibres, which comprises applying thereto a compound of formula I, stated above.

The compounds may be applied to the fibre, which may, for example, be in yarn, filament or fabric form, in conventional manner, for example from neutral to weakly acid baths.

The dyeings have good fastness to light, rubbing, water, sea water, washing, milling, perspiration and chlorinated swimming pool water.

When used in combination with other dyes, in particular other anionic dyes, the compounds are not subject to catalytic fading. On polyamide fibres of irregular affinity, the compounds give level dyeings.

The major natural polyamides are wool and silk and the major synthetic polyamides are those produced by condensation polymerisation of dibasic organic acids, for example adipic acid or sebacic acid, and hexamethylene diamine, or of ω-aminoundecanoic acid or ε-caprolactam.

The following Examples, in which parts and percentages are by weight and temperatures are in degrees Centigrade, illustrate the invention.

EXAMPLE 1

82.6 Parts of 4-(2''-nitro-4''-aminosulphonyl- phenylamino)-4'-hydroxy-1,1'-azobenzene are stirred into 500 parts of water and 1500 parts of ethyl alcohol, with heating to 60°. Then 75 parts of 1,2-oxathiolan-2,2-dioxide are added and the pH maintained at 9–10 by the addition of 30% aqueous sodium hydroxide solution.

The dye is salted out, filtered and dried. It is obtained in the form of the sodium salt, which has the formula,

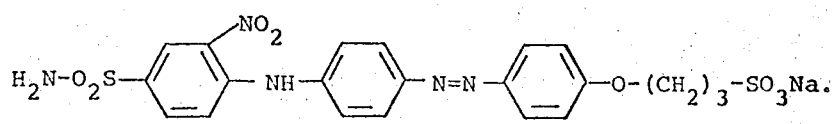

On natural and synthetic polyamide fibres this dye gives dyeings of yellow shade which have good fastness properties.

EXAMPLE 2

414 Parts of 4-(2''-nitrophenylamino)-4'-hydroxy-1,1'-azobenzene-4''-sulphonic acid are suspended in 3000 parts of water and dissolved by the addition of 135 parts of 30% aqueous sodium hydroxide solution at pH 11–11.5. The solution is raised to 70°–75° and 372 parts of para-toluenesulphonic acid methylester are added. The pH is kept at 11–11.5 by the continuous addition of a further 270 parts of 30% aqueous sodium hydroxide solution. When the pH remains constant the solution is filtered while still hot. The filtercake is washed with 1000 parts of water and dried to give the dye in the form of the sodium salt of formula

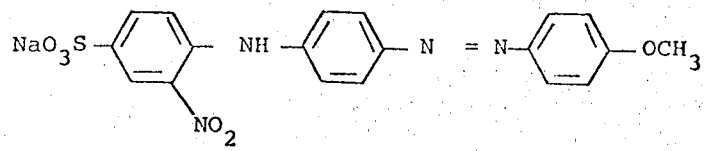

On synthetic and natural polyamide fibres fast yellow dyeings are obtained with this dye.

If the 372 parts of para-toluenesulphonic acid methylester in this Example are replaced by 630 parts of dimethyl sulphate, under the same reaction conditions the identical dye is formed.

By following the procedure of Example 1 or Example 2, and using appropriate starting materials in approximately equivalent amounts, the compounds listed in the following table and having the basic formula:

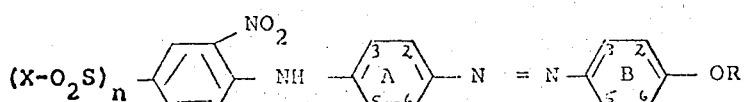

may be obtained, the significances of X, $n$, R and the nature and positions of substituents on rings A and B being indicated in the table.

Table

| No | X | N | Nature and position of substituent in the ring A | Nature and position of substituent in the ring B | R | Shade of dyeing on polyamide fibre |
|---|---|---|---|---|---|---|
| 3 | -OH | 1 | - | - | $-CH_3$ | yellow |
| 4 | do | 1 | - | - | $-C_2H_5$ | do |
| 5 | do | 1 | - | 2-Methyl | $-CH_3$ | do |
| 6 | do | 1 | - | do | $-C_2H_5$ | do |
| 7 | do | 1 | - | 3-Methyl | $-CH_3$ | do |
| 8 | do | 1 | - | do | $-C_2H_5$ | do |
| 9 | do | 1 | - | 2,3-Dimethyl | $-CH_3$ | do |
| 10 | do | 1 | - | 2,5-Dimethyl | do | do |
| 11 | do | 1 | - | - | $-C_3H_7$ | do |
| 12 | $CH_3-O-(CH_2)_3-NH-$ | 1 | - | - | $-(CH_2)_3-SO_3H$ | do |
| 13 | -OH | 1 | - | - | do | do |
| 14 | do | 1 | - | 2-Methoxy | $-CH_3$ | do |
| 15 | do | 1 | - | 3-Methoxy | do | do |
| 16 | -OH | 1 | - | 3-Chloro | $-CH_3$ | do |
| 17 | - | 0 | - | - | $-(CH_2)_3-SO_3H$ | do |
| 18 | - | 0 | - | 2-Methyl | $-(CH_2)_3-SO_3H$ | yellow |
| 19 | - | 0 | - | 3-Methyl | do | do |
| 20 | $-NH_2$ | 1 | - | - | do | do |
| 21 | $CH_3-NH-$ | 1 | - | 2-Methyl | $-(CH_2)_3-SO_3H$ | do |
| 22 | do | 1 | - | 3-Methyl | do | do |
| 23 | -NH-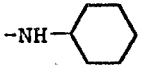 | 1 | - | do | do | do |
| 24 | -NH-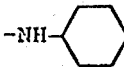-Cl | 1 | - | - | do | do |
| 25 | -NH-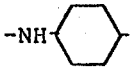-CH$_3$ | 1 | - | - | do | do |

| No. | X | N | Nature and position of substituent in the ring A | Nature and position of substituent in the ring B | R | Shade of dyeing on polyamide fibre |
|---|---|---|---|---|---|---|
| 26 | -NH-⟨⟩-OCH₃ | 1 | - | - | do | do |
| 27 | -OH | 1 | 2-Methoxy-5-methyl | - | $-C_2H_5$ | do |
| 28 | do | 1 | do | - | $-CH_3$ | do |

Formulae of representative dyes of the foregoing Examples are as follows:

EXAMPLE 5

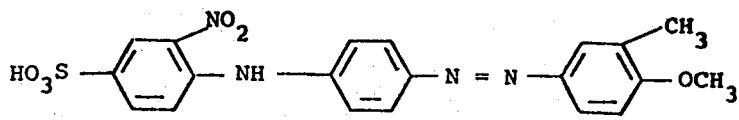

EXAMPLE 7

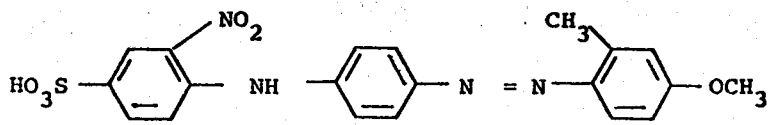

EXAMPLE 8

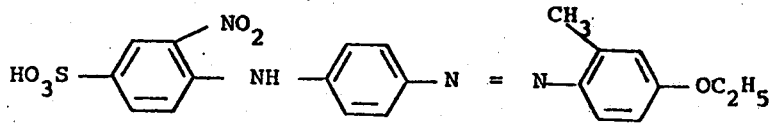

APPLICATION EXAMPLE

A dyebath is prepared with 4000 parts of water, 10 parts of anhydrous sodium sulphate and 2 parts of the dye described in Example 1. After previous wetting out, 100 parts of a fabric of synthetic polyamide fibre, for example nylon 6.6, are entered into the bath at 40°. The bath is brought to the boil in 30 minutes and held at the boil for 1 hour. At this point 4 parts of glacial acetic acid are added and dyeing is completed in a further 30 minutes at the boil. The water lost by evaporation is continuously replaced during dyeing. On removal from the bath the fabric is rinsed with water and dried. It is dyed in a yellow shade.

Wool and polyurethane fibres also can be dyed by the above method.

What is claimed is:

1. A compound of the formula

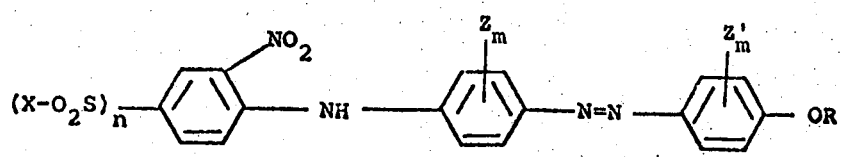

or a salt thereof,
wherein
R is alkyl of 1 to 6 carbon atoms or sulfoalkyl of 1 to 6 carbon atoms,
X is —OH or —NHR₁,
wherein
R₁ is hydrogen, alkyl of 1 to 6 carbon atoms, alkoxyalkyl wherein the alkoxy and alkyl radicals independently have 1 to 6 carbon atoms each, phenyl or substituted phenyl having 1 or 2 substituents wherein each substituent is independently halo, alkyl of 1 to 6 carbon atoms or alkoxy of 1 to 6 carbon atoms,
each Z and each Z' is independently halo, alkyl of 1 to 6 carbon atoms or alkoxy of 1 to 6 carbon atoms,
each $m$ is independently 0, 1 or 2,
$n$ is 0 or 1, and
each halo is independently chloro or bromo, with the proviso that when R is alkyl, X must be -OH and n must be 1.

2. A compound according to claim 1 having the formula

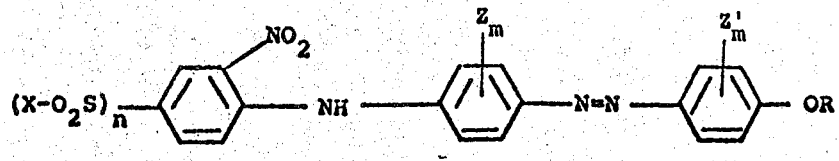

or an alkali metal or ammonium salt thereof.

3. a compound according to claim 1
wherein
R₁ is hydrogen, alkyl of 1 to 6 carbon atoms, alkoxyalkyl wherein the alkoxy radical and the alkyl radical independently have 1 to 6 carbon atoms each, phenyl or phenyl substituted by halo, alkyl of 1 to 6 carbon atoms or alkoxy of 1 to 6 carbon atoms, and
each halo is chloro.

4. A compound according to claim 3 having the formula

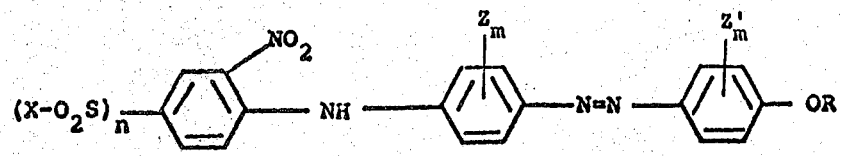

or an alkali metal salt thereof.

5. A sodium salt according to claim 4.

6. A compound according to claim 3 wherein R is sulfoalkyl of 1 to 6 carbon atoms.

7. A compound according to claim 6
wherein
X is —OH, and
$n$ is 1.

8. A compound according to claim 3 wherein
X is —NHR₁, and
R is sulfoalkyl of 1 to 6 carbon atoms.

9. A compound according to claim 8 wherein R is sulfoalkyl of 2 to 4 carbon atoms.

10. A compound according to claim 8 wherein R₁ is hydrogen.

11. A compound according to claim 8 wherein R₁ is alkyl of 1 to 6 carbon atoms or alkoxyalkyl wherein the alkoxy and alkyl radicals independently have 1 to 6 carbon atoms each.

12. A compound according to claim 3 wherein each $m$ is independently 1 or 2.

13. A compound according to claim 1 wherein
R is sulfoalkyl of 1 to 6 carbon atoms, and
X is —NHR₁,
wherein
R₁ is phenyl or substituted phenyl having 1 or 2 substituents wherein each substituent is independently halo, alkyl of 1 to 6 carbon atoms or alkoxy of 1 to 6 carbon atoms.

14. A compound according to claim 13 wherein R₁ is monosubstituted phenyl wherein the substituent is in the para position.

15. A compound according to claim 1 having the formula

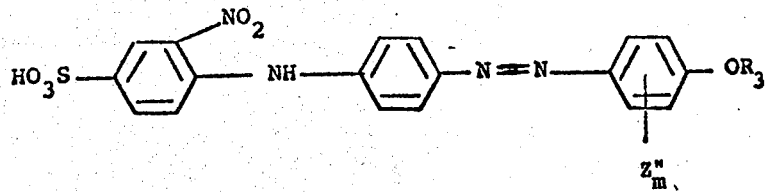

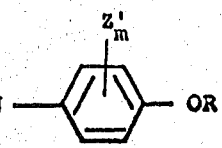

or a salt thereof,
wherein
R₃ is methyl or ethyl,
each Z'' is independently methyl or methoxy, and
$m$ is 0, 1 or 2.

16. A compound according to claim 15 having the formula

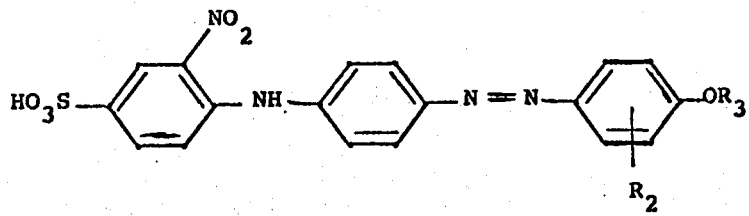

or a salt thereof,
wherein
R₂ is hydrogen, methyl or methoxy, and
R₃ is methyl or ethyl.

17. The compound according to claim 16 having the formula

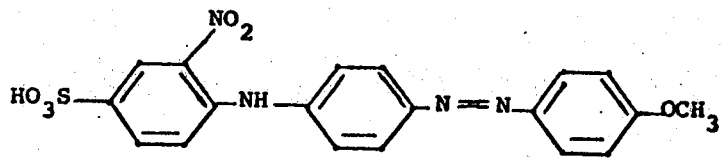

or a salt thereof.

18. The compound according to claim 16 having the formula

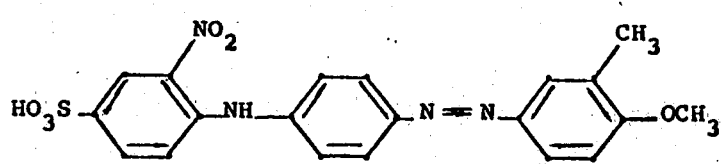

or a salt thereof.

19. The compound according to claim 16 having the formula

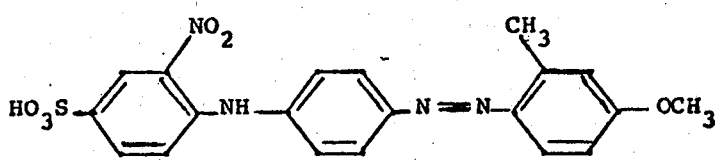

or a salt thereof.

20. The compound according to claim 16 having the formula

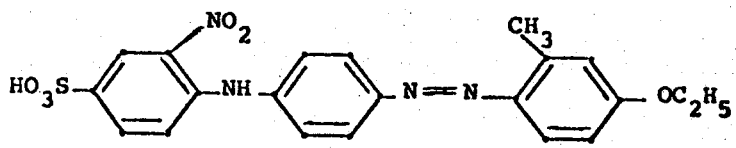

or a salt thereof.

21. The compound according to claim 10 having the formula

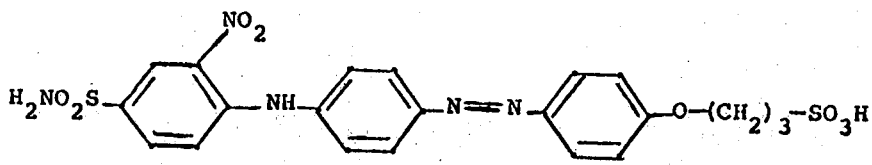

or a salt thereof.

22. A compound according to claim 3 wherein X is —OH.

23. A compound according to claim 13 wherein each halo is chloro.

24. A compound according to claim 22
wherein
R is alkyl of 1 to 6 carbon atoms,
X is —OH, and
n is 1.

* * * * *